United States Patent [19]

Anderson

[11] Patent Number: 4,678,333

[45] Date of Patent: Jul. 7, 1987

[54] DOUBLE-PASS OPTICAL INTERFEROMETER

[75] Inventor: Charles R. Anderson, Madison, Wis.

[73] Assignee: Nicolet Instrument Corporation, Madison, Wis.

[21] Appl. No.: 732,603

[22] Filed: May 10, 1985

[51] Int. Cl.$^4$ .............................. G01J 3/45; G01B 9/02
[52] U.S. Cl. .................................................... 356/346
[58] Field of Search ............................... 356/346, 359

[56] References Cited

PUBLICATIONS

Hariharan et al., "Fringes of Equal Inclination in the Double-Passed Michelson Interferometer" *J. Opt. Soc. Am.*, vol. 51, No. 6, pp. 617–619, Jun. 1961.

Primary Examiner—Davis L. Willis
Assistant Examiner—Matthew W. Koren
Attorney, Agent, or Firm—Kinney & Lange

[57] ABSTRACT

Apparatus and method for converting a conventional Michelson interferometer into a high resolution double-pass interferometer. The Michelson interferometer includes means for dividing an incident beam of radiation into first and second beams, means for propagating the first and second beams through first and second optical paths, respectively, means for recombining the first and second beams to form an output beam of radiation, and means for detecting an interference pattern in the output beam of radiation. The improvement comprises a beam splitter which is positioned to return a portion of the output beam of radiation to the interferometer as an incident beam of radiation, and a bandpass filter which is positioned between the beam splitter and the detector to filter from the output beam of radiation a portion which has been twice passed through the interferometer.

6 Claims, 3 Drawing Figures

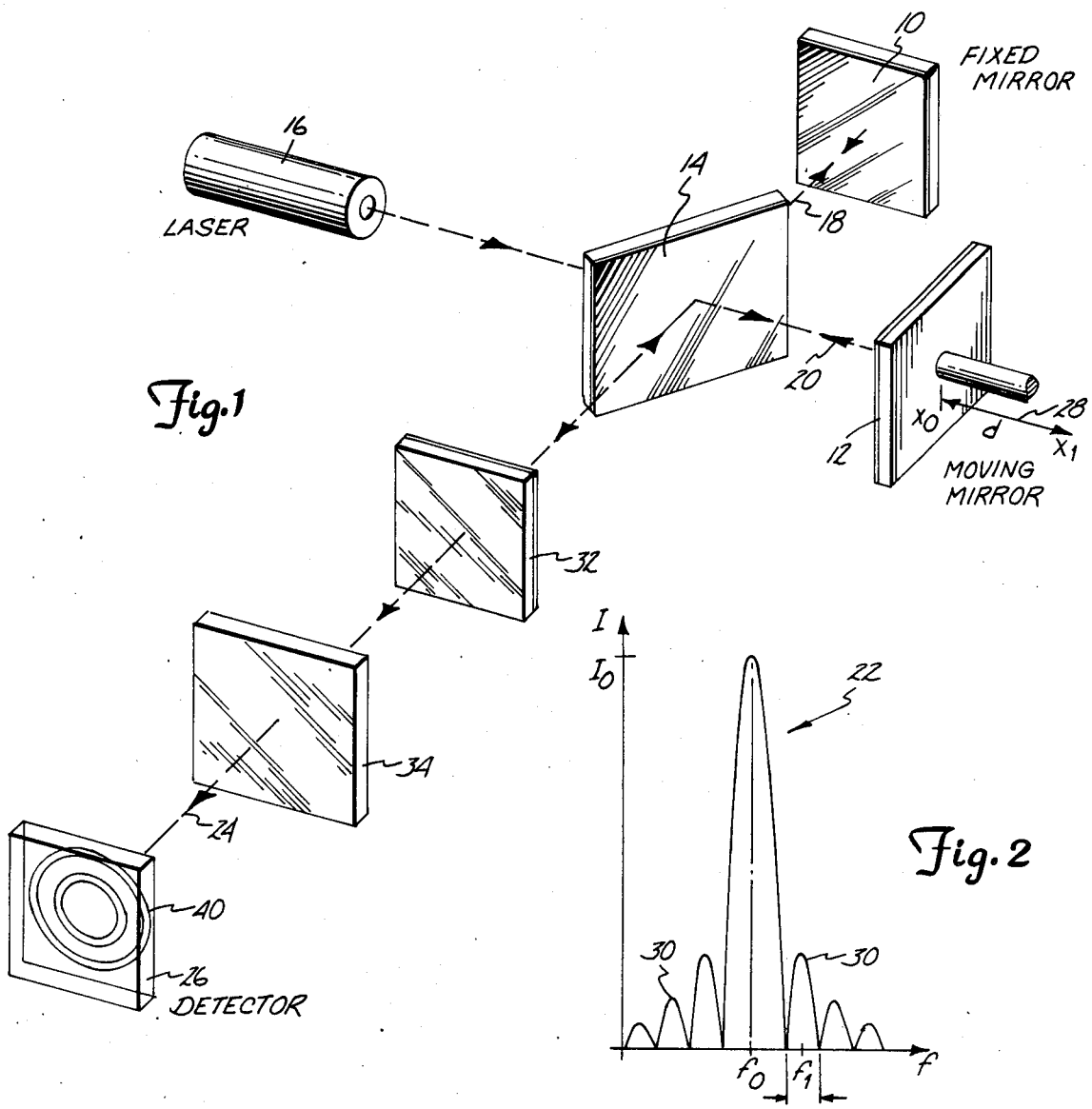
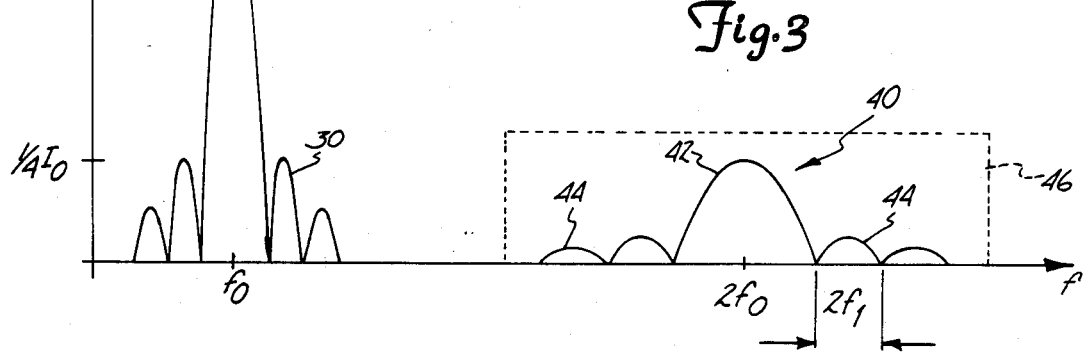

DOUBLE-PASS OPTICAL INTERFEROMETER

BACKGROUND OF THE INVENTION

1. Field of the Invention:

The present invention relates to optical interferometers. In particular, the present invention is an apparatus and method for converting a Michelson interferometer into a double-pass interferometer.

2. Description of the Prior Art:

Interferometers are well known optical devices commonly used to measure unknown lengths in terms of known wavelengths of light. Ultraprecision positioning systems, precision length measurement, thickness detection and Fourier spectroscopy are but a few of the many applications in which interferometers are found.

In a typical amplitude-splitting interferometer, an incident beam of radiation is impinged upon a beam splitter and divided into first and second beams. These two beams are each propagated through a separate optical path and modulated before being recombined. The recombined beams form an output beam of radiation which is impinged upon a detector. An interference pattern, or interferogram, within the output beam is indicative of the difference in length between the first and second optical paths. The detector produces an electrical signal as a function of the interference pattern.

Mirrors, corner cube prisms or similar optical reflection means are typically used to direct the first and second beams through their separate optical paths. At least one of these reflectors is movable to permit the length of one of the optical paths to be adjusted. The incident beam of radiation is thereby modulated and the interference pattern produced within the output beam of radiation.

In practice, the moving reflector is cyclically moved in a linear direction and at a constant velocity between two end positions. The distance separating the two end positions is known as the stroke length. Width of the side lobes in the interference pattern, and therefore resolution, is proportional to the stroke length. The interference pattern will be centered at a frequency proportional to the velocity, and therefore frequency, with which the moving reflector is cycled between the two end positions.

Various types of drive systems are used to cycle the moving reflector between its end positions. At the optical frequencies in which an interferometer operates system tolerances are critical. The reflector must be moved at an extremely constant velocity with virtually no vibrations. Variations in either of these parameters cause the interference pattern to be shifted from its center frequency. It becomes increasingly difficult to design a drive system meeting these constraints as the stroke length over which the reflector must be driven is increased. As previously mentioned, system resolution increases as stroke length increases. System design therefore involves engineering tradeoffs between velocity and vibration levels on the one hand, and resolution on the other.

It is known that the resolution of an interferometer can be doubled by redirecting the output beam of radiation through the interferometer a second time. The incident beam of radiation is thereby twice modulated with the width of the interference pattern side lobes being doubled. This increase in resolution is obtained without increasing the distance over which the moving reflector is cycled and, therefore, without the added expense and lower tolerances of a drive system needed to implement this change.

One such double-pass interferometer is disclosed by S. J. Bennett in *Optical Communications,* Vol. 4, No. 6, pp. 428-430, Mar. 1972. Incident radiation is impinged upon a polarizing beam-splitter whereby the reflected and transmitted beams are orthogonally polarized and propagated along separate optical paths. A quarter-wave plate is positioned in each optical path. Each beam therefore passes through a quarter-wave plate before being reflected by one of the interferometer mirrors and passing through the quarter-wave plate a second time. The plane of polarization of each beam is therefore rotated through 90° before returning to the beam splitter. Both beams then enter the cube-corner reflector since the beam that was first reflected is now transmitted through the beam splitter, while the beam that was first transmitted is now reflected. The retro-reflected beams emerging from the cube-corner relfector are returned to the beam splitter which for a second time directs them through the separate optical paths. Having been rotated through another 90° by two more passes through the quarter-wave plates, the two beams impinge upon the beam splitter and leave the interferometer parallel to the incident beam. The interference pattern in this double-passed output radiation can then be detected.

The Pardue et al. U.S. Pat. No. 4,334,778 discloses a dual surface interferometer which operates on a principle similar to that disclosed in the Bennett article. Light beams of two different frequencies are orthogonally polarized and directed through the interferometer. The Doppler frequency shift in one of the beams corresponds to the direction and velocity of the relative displacement of the opposed reflecting surfaces.

The Williams U.S. Pat. No. 3,109,049 discloses an interferometer in which incident light is split and twice passed through two optical paths before being recombined. Each optical path includes a pair of light reflecting elements which reflect light back on a path parallel to the incident path, but displaced therefrom.

U.S. Pat. No. 3,419,331 discloses a single and double beam interferometer. The single beam interferometer is sensitive to cosine errors in tracking and is used to measure the distance which the movable reflector has moved. The dual beam interferometer, although insensitive to cosine errors in tracking, has twice the sensitivity of the single beam. The advantages of both the single and double beam interferometer are combined on a single optical block.

U.S. Pat. No. 3,788,746 discloses an optical dilatometer, a device for measuring the linear coefficient of expansion of a specimen block. Information is obtained from the interference pattern between a reference light beam and a light beam which has twice traversed the distance to the surface whose motion is being monitored. The disclosed arrangement eliminates the need for a precisely aligned output beam splitter at the point where the interference pattern is formed.

U.S. Pat. No. 3,976,379 also discloses an interferometer. The apparatus causes two light beams which are to be interfered with each other to travel along a common path as far as possible. Even when the interferometer is slightly misaligned for various reasons, the light paths are prevented from being changed in a path difference, thereby obtaining stabilized inteference fringes.

The increased sensitivity and other advantages of double-passed interferometers make these optical devices well suited for a wide variety of applications. It is clear from the prior art, however, that the optical systems required to implement such interferometers are relatively complicated. What is needed is a double-pass interferometer which requires few optical elements and is simple and inexpensive to construct. It would be particularly advantageous if the double-pass interferometer could be constructed by retrofitting commonly used and currently existing single-pass interferometers. Furthermore, the interferometer should make full use of the maximum throughput of the interferometer geometry.

SUMMARY OF THE INVENTION

An optical interferometer includes means for dividing an incident beam of radiation into first and second beams, means for propagating the first and second beams through first and second optical paths, respectively, means for recombining the first and second beams to form an output beam of radiation, and means for detecting an interference pattern in the output beam of radiation. The improvement comprises means for returning at least a portion of the output beam of radiation to the interferometer as an incident beam of radiation, and means for filtering from the output beam of radiation a portion which has been propagated through the interferometer at least twice.

In preferred embodiments, the means for returning at least a portion of the output beam of radiation to the interferometer comprises a half-silvered mirror. The means for filtering comprises an optical bandpass filter. In still other embodiments, the interferometer is a double-pass interferometer wherein the means for filtering filters from the output beam of radiation a portion which has been twice propagated through the interferometer.

BRIEF DESCRIPTION OF THE DRAWINGS

FIG. 1 is a perspective view of the interferometer optics of the present invention.

FIG. 2 is an intensity versus frequency plot illustrating the interference pattern in the output beam of radiation of a single-pass interferometer.

FIG. 3 is an intensity versus frequency plot illustrating the interference pattern in the output beam of radiation from the interferometer of the present invention.

DETAILED DESCRIPTION OF THE PREFERRED EMBODIMENTS

The double-pass interferometer of the present invention is easily constructed from the well known and commonly used Michelson-type interferometer. In its simplest form, as illustrated in FIG. 1, a Michelson interferometer includes a fixed reflector surface such as plain mirror 10, and a movable reflector surface such as movable mirror 12. As shown, fixed mirror 10 and movable mirror 12 are positioned at right angles to each other. Positioned at an angle of 45° to these mirrors is beam splitter 14. In its simplest form, beam splitter 14 is an amplitude beam splitter comprising a half-silvered mirror. Other types of beam splitters can also be used.

A beam of incident radiation produced by a source such as laser 16 is input to the interferometer and impinged upon beam splitter 14. Beam splitter 14 divides the incident beam of radiation into first and second beam portions. The first beam is reflected by beam splitter 14 and propagated along a first optical path 18. As it propagates through first optical path 18, the first beam is reflected by fixed mirror 10 and redirected back to beam splitter 14. The second beam is transmitted through beam splitter 14 and is propagated along second optical path 20. The second beam is impinged upon and reflected by moving mirror 12 and redirected back to beam splitter 14.

The first and second beam portions which have been propagated along first and second optical paths 18 and 20, respectively have been modulated and therefore interfere with one another when recombined at beam splitter 14. The resulting interferogram 22, as illustrated in FIG. 2, is propagated from the interferometer along output path 24 and impinged upon detector 26. Interferogram 22 contains information indicative of the difference in length between the first and second optical paths 18 and 20, respectively. Detector 26 detects interferogram 22 and produces an electrical signal as a function thereof. This signal is then processed according to common and well known techniques.

Movable mirror 12 is driven by a drive system (not shown) along a displacement path 28 colinear with second optical path 20. The drive system will cycle mirror 12 about displacement path 28 between end points $x_0$ and $x_1$. These end points are separated by a distance d which represents the stroke length of the interferometer. The drive system will cycle movable mirror 12 at a constant velocity about displacement path 28. As shown in FIG. 2, interferogram 22 will be centered at a frequency $f_0$ which is a function of the frequency with which movable mirror 12 is cycled through displacement path 28. Interferogram 22 also includes side lobes 30 which are separated from each other, and center frequency $f_0$, by a frequency $f_1$. The magnitude frequency $f_1$ is a function of the stroke length d. In general, the greater stroke length d, the greater the frequency $f_1$ by which side lobes 30 are separated, and the better the resolution of the interferometer.

The double-pass interferometer of the present invention is constructed by positioning beam splitter 32 and filter 34 in output path 24 between beam splitter 14 and detector 26. Beam splitter 32 returns at least a portion of the output beam of radiation to the interferometer as an incident beam of radiation. A remaining portion of the output beam is transmitted through beam splitter 32 and impinged upon filter 34. Filter 34 filters from the output beam a portion which has been propagated through the interferometer at least twice. When used as a double-pass interferometer, filter 34 will transmit that portion of the output beam which has been twice propagated through the interferometer. This double-passed portion is then impinged upon detector 26.

In preferred embodiments beam splitter 32 is any commonly used amplitude beam splitter such as a half-silvered mirror. The portion of the output beam which is returned to the interferometer is reflected by beam splitter 32 and again impinged upon beam splitter 14. Beam splitter 14 splits this returned beam into first and second portions which are again propagated through first and second optical paths 18 and 20. The returned portion of the output beam is thereby modulated again before being recombined by beam splitter 14 and emerging from the interferometer as an output beam of radiation.

FIG. 3 is a frequency domain illustration of the output beam as it emerges from the interferometer of the present invention as described above. In addition to the interferogram 22, the output beam will include interferograms at integer multiples of center frequency $f_0$. Only the interferograms of the first and second multiples are shown. As shown, second order interferogram 40 is centered at a frequency equal to 2 $f_0$. The intensity of its central lobe 42 is only one-fourth the intensity of the central lobe of interferogram 22. Side lobes 44 of second order interferogram 40 also have proportionally lower intensity. However, since second order interferogram 40 has been twice modulated by the interferometer, side lobes 44 are separated from each other, and center frequency 2 $f_0$, by twice the frequency $f_1$ by which first order lobes 30 are separated. Resolution is thereby doubled.

A portion of the output beam, as represented in the frequency domain by FIG. 3, will be transmitted through beam splitter 32 and impinged upon filter 34. In a preferred embodiment, filter 34 is an optical bandpass filter having a pass band represented by dashed line 46 in FIG. 3. The pass band is centered at the frequency 2 $f_0$ and has a width sufficient to pass most of second order interferogram 40 while rejecting interferograms of higher and lower order. Band pass filters having these characteristics are well known to those skilled in the art. After second order interferogram 40 is filtered from the output beam, it is propagated to and impinged upon detector 26. In this way detector 26 responds only to second order interferogram 40.

From the above description it is clear that the double-pass inteferometer of the present invention can be easily constructed from existing interferometers. A system which includes a Michelson-type interferometer can, for example, be retrofitted simply by positioning beam splitter 32 and order sorting filter 34 in the output path in front of detector 26. In this manner, a single pass interferometer can be easily and inexpensively converted to a higher resolution double-pass interferometer.

Although the present invention has been described with reference to preferred embodiments, workers skilled in the art will recognize that changes may be made in form and detail without departing from the spirit and scope of the invention. In particular, although the present invention has been described with reference to a Michelson-type interferometer, the concept disclosed and claimed herein is equally well suited for use with other types of interferometers.

What is claimed is:

1. Apparatus for double passing an output beam of radiation through a Michelson-type interferometer, comprising:
   beam splitter means for reflecting a first portion of the output beam of radiation back into the interferometer, and for propagating a second portion of the output beam of radiation; and
   bandpass filter means for filtering from the propagated second portion of the output beam of radiation a portion which has been twice passed through the interferometer.

2. The apparatus of claim 1 wherein the beam splitter means comprises a half-silvered mirror.

3. A method for converting an optical interferometer of the type in which an incident beam of radiation is modulated, propagated along an output path as an output beam of radiation, and impinged upon a detector, into a double pass interferometer, including:
   positioning beam splitter means in the output path; and
   positioning bandpass filter means in the output path between the beam splitter means and the detector.

4. In an optical interferometer of the type including means for dividing an incident beam of radiation into first and second beams, means for propagating the first and second beams through first and second optical paths, respectively, means for recombining the first and second beams to form an output beam of radiation, and means for detecting an interference pattern in the output beam of radiation, the improvement comprising:
   amplitude beam splitter means for returning at least a portion of the output beam of radiation to the interferometer as an incident beam of radiation; and
   means for filtering from the output beam of radiation a portion which has been propagated through the interferometer at least twice.

5. The interferometer of claim 4 wherein the amplitude beam splitter is a half-silvered mirror which reflects at least a portion of the output beam of radiation and propagates a remaining portion.

6. The interferometer of Claim 4 wherein the means for filtering filters from the output beam of radiation a portion which has been twice propagated through the interferometer.

* * * * *